United States Patent [19]

Miyouga et al.

[11] Patent Number: 5,478,874
[45] Date of Patent: Dec. 26, 1995

[54] FLAME-RETARDANT AROMATIC POLYCARBONATE RESIN COMPOSITION AND MOLDED ARTICLE

[75] Inventors: Masahiro Miyouga, Shigenobu; Shinichi Souda, Iwakuni, both of Japan

[73] Assignee: Teijin Chemicals Ltd., Tokyo, Japan

[21] Appl. No.: 398,445

[22] Filed: Mar. 3, 1995

Related U.S. Application Data

[63] Continuation-in-part of Ser. No. 281,022, Jul. 27, 1994, abandoned.

[30] Foreign Application Priority Data

Jul. 27, 1993 [JP] Japan .................. 5-184839

[51] Int. Cl.[6] ............................. C08J 5/00; G08G 63/02
[52] U.S. Cl. .................. 524/156; 524/147; 524/165; 524/410; 524/412; 524/462; 525/395; 525/462; 528/196; 528/198; 528/200
[58] Field of Search .................... 524/147, 156, 524/165, 410, 411, 412, 462; 525/395, 462; 528/196, 198, 200

[56] References Cited

U.S. PATENT DOCUMENTS 5,045,582  9/1991  Hashimoto et al. .................. 524/156

*Primary Examiner*—James J. Seidleck
*Assistant Examiner*—Terressa Mosley
*Attorney, Agent, or Firm*—Sherman and Shalloway

[57] ABSTRACT

A flame-retardant aromatic polycarbonate resin composition has excellent flame retardancy and high transparency without impairing excellent properties inherent to an aromatic polycarbonate resin, and is free from corroding a molding machine or a processing machine, the flame-retardant resin composition comprising 100 parts by weight of an aromatic polycarbonate resin, 0.01 to 1 part by weight of (a) a perfluoroalkane-sulfonic acid alkali salt and 0.02 to 2 parts by weight of (b) a halogenated triaryl phosphate of the formula [1],

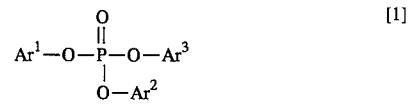

wherein each of $Ar^1$, $Ar^2$ and $Ar^3$ is independently an aromatic hydrocarbon, and at least one halogen atom is substituted on ring-forming carbon of each aromatic hydrocarbon group.

10 Claims, No Drawings

FLAME-RETARDANT AROMATIC POLYCARBONATE RESIN COMPOSITION AND MOLDED ARTICLE

CROSS-REFERENCE TO RELATED APPLICATION

This application is a continuation-in-part of application, U.S. patent application Ser. No. 08/281,022 now abandoned filed Jul. 27, 1994.

DETAILED DESCRIPTION OF THE INVENTION

1. Field of Industrial Utilization

The present invention relates to a flame-retardant aromatic polycarbonate resin composition and a molded article therefrom. More specifically, it relates to an aromatic polycarbonate resin composition which is remarkably free from corroding a molding machine and a processing machine, retains excellent properties inherent to an aromatic polycarbonate resin, has high transparency and has excellent flame retardancy, and a molded article formed therefrom.

2. Prior Art

Having many excellent properties, an aromatic polycarbonate resin is widely used in a large amount in a variety of fields. Since, however, an aromatic polycarbonate resin is combustible, it is required to have severe flame retardancy in some fields. For imparting an aromatic polycarbonate resin with flame retardancy, there is known a conventional method in which an organic halogen compound is incorporated into the aromatic polycarbonate resin. For example, Japanese Patent Publication No. 47-44587 discloses a method in which a polycarbonate oligomer obtained from tetrabromobisphenol A as a dihydroxy component is incorporated in such an amount that the bromine concentration is 5 to 15% by weight. Japanese Patent Publication No. 47-24660 discloses a method in which a carbonate copolymer obtained from tetrabromobisphenol A and bisphenol A as dihydroxy components is incorporated in such an amount that the bromine concentration is 5 to 9% by weight. However, when a flame-retardant aromatic polycarbonate resin composition containing such a bromine-based flame retardant is molded or processed, a molding machine or a processing machine is liable to be corroded, and the corrosion is intensified with an increase in the bromine concentration. It is therefore desired to develop an aromatic polycarbonate resin which is free from corroding a molding machine and a processing machine and has excellent flame retardancy.

Further, there is known a method in which a bromine-free flame retardant is incorporated into an aromatic polycarbonate resin. Japanese Patent Publication No. 47-40445 discloses a method in which potassium perfluoroalkanesulfonate is incorporated into an aromatic polycarbonate resin. According to this method, the amount of corrosive toxic gas decreases, while the resin composition shows a decrease in heat stability when the resin composition contains the potassium perfluoroalkanesulfonate in a sufficient amount for exhibiting adequate flame retardancy.

U.S. Pat. No. 5,045,582 discloses "A fire-retardant polycarbonate resin composition comprising 100 parts by weight of a halogen atom-free conventional polycarbonate resin having a viscosity-average molecular weight of 10,000 to 30,000, a fire-retardant in an amount necessary for imparting fire retardance, and 5 to 60 parts by weight of a halogen atom-free ultrahigh-molecular-weight polycarbonate resin having a viscosity-average molecular weight of 100,000 to 250,000." According to the invention of the above U.S. Pat. No. 5,045,582, a fire retardant and an ultrahigh-molecular-weight polycarbonate resin are incorporated into a conventional polycarbonate resin for imparting the polycarbonate resin with fire retardance. In this invention, the fire retardant is not specially limited, and any available fire retardant may be incorporated into the polycarbonate resin. Further, the amount of the fire retardant is preferably 5 to 20% by weight, particularly preferably 3 to 15% by weight although the amount of the fire retardant is not specially limited.

In the invention of the above U.S. Pat. No. 5,045,582, the production of the ultrahigh-molecular-weight polycarbonate resin used as an essential component is complicated and requires an additional cost. Further, the handling thereof is also difficult. Moreover, the composition produced according to this invention has low transparency and is far from good processability and moldability or from avoiding the corrosion of a molding machine although it accomplishes fire retardance.

Problems to be Solved by the Invention

It is an object of the present invention to provide an aromatic polycarbonate resin composition which is remarkably free from corroding a molding machine and a processing machine, retains excellent properties inherent to a conventional aromatic polycarbonate resin, has high transparency and has excellent frame retardancy, and a molded article formed therefrom.

For achieving the above object, the present inventors have made diligent studies and as a result have found the following: When a combination of potassium perfluoroalkanesulfonate with a small amount of halogenated triarylphosphate is incorporated into an aromatic polycarbonate resin, the aromatic polycarbonate resin can be imparted with excellent flame retardancy, and its transparency can be retained, and the amount of the potassium perfluoroalkanesulfonate can be decreased. Thus, the present invention has been accomplished.

Means to Solve the Problems

According to the studies of the present inventors, the above object and advantages of the present invention are achieved by a flame-retardant aromatic polycarbonate resin composition comprising 100 parts by weight of an aromatic polycarbonate resin, which has the viscosity-average molecular weight of 10,000 to 50,000, 0.01 to 1 part by weight of (a) a perfluoroalkanesulfonic acid alkali salt and 0.02 to 2 parts by weight of (b) a halogenated triaryl phosphate of the formula [1],

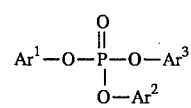

wherein each of $Ar^1$, $Ar^2$ and $Ar^3$ is independently an aromatic hydrocarbon group, and at least one halogen atom is substituted on ring-forming carbon(s) of each aromatic hydrocarbon group.

The resin composition of the present invention will be detailed hereinafter.

The aromatic polycarbonate resin used in the resin composition of the present invention may be any conventional aromatic polycarbonate resin for molding, and it shall not be specially limited. For example, as an aromatic polycarbonate resin, there may be used an aromatic polycarbonate resin obtained by reacting a dihydric phenol with a carbonate precursor by a solution method or a melting method.

Examples of the above dihydric phenol include 2,2-bis(4-hydroxyphenyl)propane (to be referred to as "bisphenol A" hereinafter). bis(4-hydroxyphenyl)methane, 2,2-bis(4-hydroxy-3,5-dimethylphenyl)propane, 2,2-bis(4-hydroxy-3,5-dibromophenyl)propane. 2,2-bis(4-hydroxy-3-methylphenyl)methane, 1,1-bis(4-hydroxyphenyl)cyclohexane, bis(4-hydroxyphenyl)sulfide and bis(4-hydroxyphenyl)sulfone. These dihydric phenols may be substituted with an alkyl group or an aryl group. These dihydric phenols may be used alone or in combination. Of these, bisphenol A is preferred. Examples of the above carbonate precursor include carbonyl halides, diaryl carbonates and haloformates, and specific examples thereof include phosgene, diphenyl carbonate and dihaloformate of a dihydric phenol. The viscosity-average molecular weight of the aromatic polycarbonate resin is generally 10,000 to 50,000, preferably 15,000 to 40,000. For the production of the above aromatic polycarbonate resin, there may be used a generally known proper molecular weight regulating agent and a reaction-promoting catalyst as required.

Further, the aromatic polycarbonate resin used in the present invention may be any one of a branched polycarbonate resin obtained from a small amount of a polyfunctional compound as a comonomer component and a polyester carbonate resin obtained from a small amount of an aromatic or aliphatic difunctional carboxylic acid having at least 8 carbon atoms as a comonomer.

In the resin composition of the present invention, the (a) perfluoroalkanesulfonic acid alkali salt (to be sometimes referred to as component (a) hereinafter) contains an alkyl group which preferably has 1 to 8 carbon atoms, more preferably 3 to 8 carbon atoms, and all the hydrogen atoms of the alkyl group are replaced by fluorine atoms. The alkali metal constituting the above alkali salt includes alkali metals and an alkaline earth metals, and preferred are alkali metals such as potassium and sodium. Specific examples of the component (a) preferably include potassium perfluorobutanesulfonate and sodium perfluorooctanesulfonate. The amount of the component (a) per 100 parts by weight of the aromatic polycarbonate resin is 0.01 to 1 part by weight, and it is preferably 0.02 to 0.5 part by weight. When the amount of the component (a) is less than 0.01 part by weight, it is difficult to accomplish sufficient flame retardancy even if tile halogenated triaryl phosphate to be described later is incorporated in combination. When the amount of the component (a) exceeds 1 part by weight, the heat stability of the resin composition is low and the transparency of the resin composition is not sufficient.

The resin composition of the present invention further contains other component, i.e., a halogenated triaryl phosphate (to be sometimes referred to as "component (b) hereinafter) of the following formula [1],

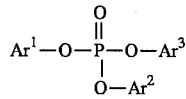
(1)

In the formula [1], each of $Ar^1$, $Ar^2$ and $Ar^3$ is independently an aromatic hydrocarbon group, and at least one halogen atom is substituted on ring-forming carbon of each aromatic hydrocarbon group.

The above aromatic hydrocarbon has 6 to 20 carbon atoms, preferably 6 to 18 carbon atoms. Specifically, preferred examples of the aromatic hydrocarbon includes a benzene ring, a naphthalene ring and a diphenyl ring of

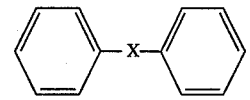

in which X is —$CH_2$—, —O—, —C(O)—, —S—, —$SO_2$—, an alkylidene group having 2 to 6 carbon atoms or a cycloalkylidene group having 3 to 6 carbon atoms. A benzene ring is particularly preferred. In each of the hydrocarbons, at least one halogen atom is substituted on ring-forming carbon(s). The halogen atom includes chlorine, bromine, fluorine and iodine. Chlorine and bromine are preferred, bromine is particularly preferred. Further, the number of halogen atoms substituted on each aromatic hydrocarbon is preferably 1 to 5. more preferably 1 to 3. Each hydrocarbon group may further contain other substituent such as lower alkyl, aryl, aralkyl or aryloxy.

Specific examples of the aromatic hydrocarbons ($Ar^1$, $Ar^2$ and $Ar^3$) include 2,4,6-tribromophenyl, 2,4-dibromophenyl, 4-bromophenyl, 4-chloro-2,6-dibromophenyl, 2,4-dichloro-6-bromophenyl, 2,6-dibromo-4-methylphenyl, 2,4,6-trichlorophenyl, 2,4-dichloroohenyl, 4-chlorophenyl and 2,6-dichloro-4-phenylphenyl.

The amount of the halogenated triaryl phosphate (component (b)) of the formula [1] per 100 parts by weight of the aromatic polycarbonate resin is 0.02 to 2 parts by weight, preferably 0.03 to 1 part by weight. When the amount of the component (b) is less than 0.02 part by weight, it is difficult to impart the aromatic polycarbonate resin with adequate flame retardancy. When it exceeds 2 parts by weight, the aromatic polycarbonate resin composition is liable to be impaired in hue and mechanical properties. In the above range, the corrosion of a molding machine or a processing machine is prevented.

The halogenated triaryl phosphate (component (b)) is preferably free of impurities such as salts and phosphate ester halides. When the amount of these impurities is too large, the flame-retardant aromatic polycarbonate resin composition becomes turbid or shows decreased transparency, or it shows decreased heat resistance. As a result, it shows dull in hue in melt-molding.

The salts as the above impurities include alkali metal and alkaline earth metal halides such as sodium chloride and calcium chloride, alkali metal and alkaline earth metal phosphates such as sodium phosphate and calcium phosphate, and alkali metal and alkaline earth metals salts of partial phosphoric acid phenyl ester. Examples of the phosphate ester halide include halides of phosphoric acid monophenyl ester and phosphoric acid diphenyl ester.

The content of the above impurities in the halogenated triaryl phosphate is not more than 3% by weight, preferably not more than 0.5% by weight.

Commercially available halogenated triaryl phosphate generally contains a large amount of the above impurities. For using commercially available halogenated triaryl phosphate, it is required to improve the purity thereof by repeating its recrystallization. The purity of halogenated triaryl phosphate can be increased by any known method, while a halogenated triaryl phosphate whose impurity content is remarkably low can be synthesized, for example, by the following method, in which the amount of the above impurities can be remarkably decreased and the halogenated triaryl phosphate obtained has a purity suitable for use in the present invention.

That is, the halogenated triaryl phosphate of the formula [1] can be obtained as follows. At least one compound of the formula, HO—Ar (in which Ar has the same meaning as $Ar^1$, $Ar^2$ or $Ar^3$) and phosphorus pentachloride are allowed to react at a temperature between −30° C. and 200° C. in the substantial absence of a catalyst to form a chlorophosphorane compound, and the chlorophosphorane compound and any one of water, an alcohol, an alcohol aqueous solution or an alkaline solution are allowed to react at a temperature between −30° C. and 100° C. to form the halogenated triaryl phosphate of the formula [1].

The resin composition of the present invention satisfies the high levels of flame retardancy, transparency and freedom from the corrosion of a molding machine, since both the above components (a) and (b) in the above amount ranges are incorporated into the aromatic polycarbonate. When the above component (a) or (b) alone is incorporated In a small amount (within the above amount range), e.g., in an amount of 0.1 part by weight, the composition shows insufficient flame retardancy (V-2). However, when both the components (a) and (b) are incorporated in small amounts, surprisingly, the composition shows sufficient flame retardancy (V-0) as will be clear in Examples to be described later.

The total amount of the above component (a) and (b) per 100 parts by weight of the aromatic polycarbonate resin is 2.5 parts by weight or less, preferably properly 2 parts by weight or less. In this case, the composition is superior in flame retardancy and freedom from corroding a molding machine.

The resin composition of the present invention therefore has the following excellent properties: (i) The flame retardancy based on UL-94 is V-0, (ii) the relative transparency is at least 0.6, preferably at least 0.7, and (iii) the value of corrosion test (ΔYI) is 15 or less, preferably 12 or less.

The resin composition of the present invention can be produced by any method. For example, the perfluoroalkanesulfonic acid alkali salt (component (a)) and the halogenated triaryl phosphate (component (b)) are mixed in advance, and the mixture is added to the aromatic polycarbonate resin. Or, any one of the component (a) and the component (b) is first added to the aromatic polycarbonate resin, and then the remaining component (a) or (b) is added. Then, these components (a) and (b) and the aromatic polycarbonate resin are mixed, for example, with a super mixer or a tumbler.

The so-obtained composition may be formed into pellets with an extruder. The above composition as such or the pellets thereof are molded into a molded article by a general injection molding method, extrusion molding method or compression molding method. The so-obtained molded article has excellent flame retardancy while retaining excellent properties inherent to the aromatic polycarbonate resin.

The resin composition of the present invention may further contain 0.01 to 2% by weight of a fluorine resin, so that the dripping at a combustion time can be prevented and that the resin composition can be further improved in flame retardancy. The fluorine resin includes polytetrafluoroethylene, a tetrafluoroethylene-hexafluoropropylene copolymer, a tetrafluoroethylene-perfluoroalkylvinylether copolymer, a tetrafluoroethylene-ethylene copolymer, polychlorotrifluoroethylene, polyvinylidene fluoride, polyvinyl fluoride and a vinylidene fluoride-hexafluoropropylene copolymer.

The resin composition of the present invention may further contain additives generally incorporated into resin molding materials, such as a mold releasing agent, an antistatic agent, a photostabilizer, an antioxidant, a reinforcing material, a foaming agent, a pigment, a dye and an inorganic filler.

The mold releasing agent includes pentaerythritol tetrastearate, pentaerythritol tetrapelargonate, steary stearate, behenic behenate, stearyl mono-, di- or triglyceride, sorbitan monostearate, paraffin wax, beeswax, polydimethylsiloxane and phenyl-containing dimethylsiloxane. The amount of the mold releasing agent is generally 0.001 to 5% by weight.

The antistatic agent includes glycerin monostearate, dodecylbenzenesulfonic acid ammonium salt, dodecylbenzenesulfonic acid phosphonium salt, Hi-Boron LB-120 (supplied by Boron International), maleic anhydride mono- or diglyceride, graphite and a metal powder. The amount of the antistatic agent is generally 0.1 to 10% by weight.

The photostabilizer includes 2-(2-hydroxy-5-tert-octylphenyl)benzotriazole, 2-(3-tert-butyl-5-methyl-2-hydroxyphenyl)-5-chlorobenzotriazole, 2-(5-methyl-2-hydroxyphenyl)benzotriazole, 2-[2-hydroxy-3,5-bis(α, α-dimethylbenzyl)phenyl]-2H-benzotriazole, 2,2'-methylenebis(4-cumyl-6-benzotriazolephenyl), 2,2'-p-phenylenebis(3,1-benzoxazin-4-one) and polyalkylene naphthalate. The amount of the photostabilizer is generally 0.01 to 5% by weight.

The antioxidant includes phosphoric acid and an ester thereof, phosphorous acid or an ester thereof, pentaerythritoltetrakis(3-mercaptopropionate), pentaerythritoltetrakis(3-laurylpropionate), glycerol-3-stearylthiopropionate, octadecyl-3-(3,5-di-tert-butyl-4-hydroxyphenyl)propionate, tris(2, 4-di-tert-butylphenyl)phosphite, and tetrakis(2,4-di-tert-butylphenyl)-4,4'-biphenylenephosphonate. The amount of the antioxidant is generally 0.001 to 10% by weight.

The reinforcing material includes a metal fiber, a carbon fiber, a graphite fiber, an alumina fiber, a silicon nitride fiber, a potassium titanate whisker, a boron fiber, a wholly aromatic polyamide fiber, and a wholly aromatic polyester fiber. The amount of the reinforcing material is generally 1 to 60% by weight.

The present invention will be explained more in detail hereinafter with reference to Examples, in which "part" stands for "part by weight", and resin compositions were measured or evaluated for flame retardancy, transparency and freedom from corroding a molding machine as follows.

(i) Flame retardancy:

Measured according to Subject 94 of Underwriters Laboratory (UL-94).

(ii) Transparency:

A resin composition was dried at 120° C. for 6 hours, and injection-molded at a cylinder temperature of 290° C. at a mold temperature of 80° C. to prepare a sample plate (50×70×2 mm), and the sample plate was measured for a transmittance with a haze meter SEP-H-2 supplied by NIHON SEIMITSU KOGAKU K. K. A relative transparency was calculated on the basis of the following equation.

$$\text{Relative transparency} = \frac{T_1}{T_2}$$

wherein $T_1$ is the transmittance of a composition containing flame retardant components, and $T_2$ is the transmittance of a composition containing no flame retardant components.

(iii) Freedom from Corroding:

50 Grams of pellets of a composition were placed in a testing container, and a metal test piece (material S55C, dimension 30φ×3 mm) was added. The metal test piece was heat-treated at 330° C. for 90 minutes. The metal test piece was measured for a yellowing degree (YI) after the heat treatment and before the heat treatment with a color difference meter SZ-Σ80, supplied by NIPPON DENSHOKU IND. CO. LTD., and the corrosion (ΔYI) was calculated on the basis of the following equation.

$$\Delta YI = YI_2 - YI_1$$

wherein $YI_1$ is the hue of a metal test piece before the heat treatment, and $YI_2$ is the hue of the metal test piece after the heat treatment (330° C.×90 minutes).

Examples 1–3 and Comparative Examples 1 and 2

100 Parts of a fine powder of an aromatic polycarbonate resin which was obtained from bisphenol A, p-tert-butylphenol as a molecular weight regulator and phosgene by a conventional method and had a viscosity-average molecular weight of 22,000, potassium perfluorobutanesulfonate in an amount shown in Table 1 and tris(2,4,6-tribromophenyl)phosphate in an amount shown in Table 1 were mixed with a tumbler for 10 minutes, and the mixture was dried in a hot-air circulating dryer at 120° C. for 6 hours. The dry mixture was pelletized with a 30 φ extruder at a cylinder temperature of 280° C., and the resultant pellets were dried at 120° C. for 4 hours. Then, the dry pellets were injection-molded with a 5-oz (141.5 g) injection molding machine (supplied by Sumitomo Nestar) at 290° C. to prepare 20 sample pieces (125 mm×13mm× 3 mm), and the samples were evaluated for flame retardancy, transparency and freedom from corroding. Table 1 shows the results.

Referential Example

100 Parts of a fine powder of an aromatic polycarbonate resin having a viscosity average molecular weight of 22,000, obtained from bisphenol A, p-tert-butylphenol as a molecular weight regulator and phosgene by a conventional method, was dried with a hot air-circulating dryer at 120° C. for 6 hours, and pelletized with a 30 φ extruder at a cylinder temperature of 280° C. The resultant pellets were dried at 120° C. for 4 hours and injection molded with a 5-ounce injection molding machine [supplied by Sumitomo Nestar] at 290° C. to form samples for the evaluation of transparency. Further, the above procedures were repeated except that the fine powder was replaced with a fine powder of an aromatic polycarbonate resin having a viscosity average molecular weight of 30,000, to prepare similar samples.

The abbreviations used in Table 1 stand for the following.

PC: aromatic polycarbonate resin

P-1: fine powder of aromatic polycarbonate resin having a viscosity-average molecular weight of 22,000.

P-2: fine powder of aromatic polycarbonate resin having a viscosity-average molecular weight of 30,000.

Component (a): potassium perfluorobutanesulfonate

Component (b): tris(2,4,6-tribromophenyl)phosphate

TABLE 1

| | PC | | Flame retardant | | Flame retardancy (UL-94V) | | | | |
| --- | --- | --- | --- | --- | --- | --- | --- | --- | --- |
| | | | Component | Component | Average combustion | Cotton ignited by flaming | | | Corrosion |
| | kind | Amount (part) | (a) (part) | (b) (part) | time (second) | particles or drops | Evaluation | Transparency | (ΔYI) |
| Ex. 1 | P-1 | 100 | 0.05 | 0.1 | 4.0 | No | V-0 | 1.0 | 10 |
| Ex. 2 | P-1 | 100 | 0.07 | 0.07 | 3.2 | No | V-0 | 1.0 | 8 |
| Ex. 3 | P-1 | 100 | 0.1 | 0.05 | 2.8 | No | V-0 | 0.9 | 9 |
| CEx. 1 | P-1 | 100 | 0.1 | — | 3.3 | Yes | V-2 | 0.9 | 9 |
| CEx. 2 | P-1 | 100 | — | 0.1 | 3.0 | Yes | V-2 | 1.0 | 11 |
| Ex. 4 | P-2 | 100 | 0.05 | 0.1 | 4.6 | No | V-0 | 1.0 | 10 |
| Ex. 5 | P-2 | 100 | 0.07 | 0.07 | 3.8 | No | V-0 | 1.0 | 8 |
| Ex. 6 | P-2 | 100 | 0.1 | 0.05 | 3.2 | No | V-0 | 0.9 | 9 |
| CEx. 3 | P-2 | 100 | 0.1 | — | 3.5 | Yes | V-2 | 0.9 | 9 |
| CEx. 4 | P-2 | 100 | — | 0.1 | 3.8 | Yes | V-2 | 1.0 | 11 |

Examples 4–6 and Comparative Examples 3 and 4

Samples were prepared in the same manner as in Example 1 except that the fine powder of an aromatic polycarbonate resin was replaced with a fine powder of an aromatic polycarbonate resin which was obtained from bisphenol A, p-tert-butylphenol as a molecular weight regulator and phosgene by a conventional method and had a viscosity-average molecular weight of 30,000. The samples were evaluated for flame retardancy, transparency and freedom corroding, and Table 1 shows the results.

Comparative Examples 5 and 6

Samples were prepared in the same manner as in Example 1 or Example 4 except that the potassium perfluorobutanesulfonate and tris(2,4,6-tribromophenyl)phosphate were replaced with a polycarbonate oligomer produced from tetrabromobisphenolm A as a dihydroxy component. The samples in Comparative Example 5 showed the flame retardancy as follows. Average combustion time: 3.7 to 3.8 seconds, cotton ignited by flaming particles or drops: yes, and flame retardancy: V-2. The samples in Comparative Example 6 showed the flame retardancy as follows. Average combustion time: 4.0 to 4.1 seconds, cotton ignited by flaming particles or drops: yes, and flame retardancy: V-2.

Examples 7–9 and Comparative Examples 7–12

Example 1 was repeated except that the amounts of the potassium perfluorobutanesulfonate and the tris(2,4,6-tribromophenyl)phosphate were changed as shown in Table 2. Table 2 shows the results.

Examples 10–12 and Comparative Examples 13–18

Example 4 was repeated except that the amounts of the potassium perfluorobutanesulfonate and the tris(2,4,6-tribromophenyl)phosphate were changed as shown in Table 2. Table 2 shows the results.

The abbreviations used in Table 2 stands for the following
P-3: fine powder of aromatic polycarbonate resin having a viscosity average molecular weight of 22,000.
P-4: fine powder of aromatic polycarbonate resin having a viscosity average molecular weight of 30,000.
Flame retardant A: potassium perfluorobutanesulfonate
Flame retardant B: tris(2,4,6-tribromophenyl)-phosphate

TABLE 2

| | PC | | Flame retardant | | Flame retardancy (UL-94V) | | | | |
|---|---|---|---|---|---|---|---|---|---|
| | kind | Amount (part) | Component (a) (part) | Component (b) (part) | Average combution time (second) | Cotton ignited by flaming particles or drops | Evaluation | Transparency | Corrosion ($\Delta$YI) |
| Ex. 7 | P-3 | 100 | 0.8 | 0.1 | 2.9 | No | V-0 | 0.7 | 9 |
| Ex. 8 | P-3 | 100 | 0.1 | 1.8 | 3.1 | No | V-0 | 0.9 | 12 |
| Ex. 9 | P-3 | 100 | 0.07 | 0.07 | 3.3 | No | V-0 | 1.0 | 8 |
| CEx. 7 | P-3 | 100 | 3 | 0 | 3.7 | No | V-0 | 0 | 10 |
| CEx. 8 | P-3 | 100 | 3 | 0.1 | 3.9 | No | V-0 | 0 | 11 |
| CEx. 9 | P-3 | 100 | 1.5 | 0.1 | 3.8 | No | V-0 | 0.5 | 10 |
| CEx. 10 | P-3 | 100 | 0 | 3 | 4.5 | No | V-0 | 1.0 | 20 |
| CEx. 11 | P-3 | 100 | 0.1 | 3 | 4.0 | No | V-0 | 0.9 | 21 |
| CEx. 12 | P-3 | 100 | 0.1 | 2.5 | 4.1 | No | V-0 | 0.9 | 17 |
| Ex. 10 | P-4 | 100 | 0.8 | 0.1 | 3.2 | No | V-0 | 0.7 | 9 |
| Ex. 11 | P-4 | 100 | 0.1 | 1.8 | 3.5 | No | V-0 | 0.9 | 12 |
| Ex. 12 | P-4 | 100 | 0.07 | 0.07 | 3.7 | No | V-0 | 1.0 | 8 |
| CEx. 13 | P-4 | 100 | 3 | 0 | 4.0 | No | V-0 | 0 | 10 |
| CEx. 14 | P-4 | 100 | 3 | 0.1 | 4.1 | No | V-0 | 0 | 11 |
| CEx. 15 | P-4 | 100 | 1.5 | 0.1 | 4.3 | No | V-0 | 0.5 | 10 |
| CEx. 16 | P-4 | 100 | 0 | 3 | 4.8 | No | V-0 | 1.0 | 20 |
| CEx. 17 | P-4 | 100 | 0.1 | 3 | 4.3 | No | V-0 | 0.9 | 21 |
| CEx. 18 | P-4 | 100 | 0.1 | 2.5 | 4.3 | No | V-0 | 0.9 | 17 |

What is claimed is:

1. A flame-retardant aromatic polycarbonate resin composition comprising 100 parts by weight of an aromatic polycarbonate resin, which has a viscosity-average molecular weight of 10,000 to 50,000, 0.01 to 1 part by weight of (a) a perfluoroalkanesulfonic acid alkali salt and 0.02 to 2 parts by weight of (b) a halogenated triaryl phosphate of the formula [1],

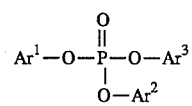

[1]

wherein each of $Ar^1$, $Ar^2$ and $Ar^3$ is independently an aromatic hydrocarbon, and at least one halogen atom is substituted on ring-forming carbon of each aromatic hydrocarbon group.

2. The composition of claim 1, wherein the perfluoroalkanesulfonic acid alkali salt is contained in an amount of 0.02 to 2 parts by weight per 100 parts by weight of the aromatic polycarbonate resin.

3. The composition of claim 1, wherein the halogenated triaryl phosphate is contained in an amount of 0.03 to 1 part by weight per 100 parts by weight of the aromatic polycarbonate resin.

4. The composition of claim 1, wherein the total amount of the perfluoroalkanesulfonic acid alkali salt and the halogenated triaryl phosphate is less than 2.5 parts by weight per 100 parts by weight of the aromatic polycarbonate resin.

5. The composition of claim 1, wherein the aromatic polycarbonate resin have the viscosity-average molecular weight of 15,000 to 40,000.

6. The composition of claim 1, wherein the aromatic polycarbonate resin is a polycarbonate produced from 2,2-bis(4-hydroxyphenyl)propane as a dihydric component.

7. The composition of claim 1, wherein the perfluoroalkanesulfonic acid alkali salt is a potassium salt or sodium salt of perfluoroalkanesulfonic acid having 1 to 8 carbon atoms.

8. The composition of claim 1, wherein the halogenated triaryl phosphate is brominated and/or chlorinated triphenyl phosphate.

9. The composition of claim 1, wherein (i) the flame retardancy under UL-94D has the value of V-0, (ii) the relative transparency is more than 0.6, and (iii) the value of corrosion test ($\Delta$YI) is less than 15.

10. A molded article formed from the aromatic polycarbonate resin composition as recited in claim 1.

* * * * *